(12) United States Patent
Wakabayashi et al.

(10) Patent No.: US 12,294,107 B2
(45) Date of Patent: May 6, 2025

(54) BATTERY PACK

(71) Applicant: SANYO Electric Co., Ltd., Osaka (JP)

(72) Inventors: Takeaki Wakabayashi, Hyogo (JP); Kensaku Takeda, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 742 days.

(21) Appl. No.: 17/422,812

(22) PCT Filed: Dec. 9, 2019

(86) PCT No.: PCT/JP2019/048015
§ 371 (c)(1),
(2) Date: Jul. 14, 2021

(87) PCT Pub. No.: WO2020/153016
PCT Pub. Date: Jul. 30, 2020

(65) Prior Publication Data
US 2022/0069411 A1    Mar. 3, 2022

(30) Foreign Application Priority Data
Jan. 25, 2019  (JP) ................. 2019-011546

(51) Int. Cl.
*H01M 50/367*    (2021.01)
*H01M 50/213*    (2021.01)
(Continued)

(52) U.S. Cl.
CPC ....... *H01M 50/367* (2021.01); *H01M 50/213* (2021.01); *H01M 50/24* (2021.01); *H01M 50/247* (2021.01); *H01M 10/0525* (2013.01)

(58) Field of Classification Search
None
See application file for complete search history.

(56) References Cited

U.S. PATENT DOCUMENTS

| 5,741,305 A * | 4/1998 | Vincent ................. H02J 7/0042 |
| | | 439/500 |
| 2012/0164490 A1* | 6/2012 | Itoi ..................... H01M 50/358 |
| | | 429/82 |

(Continued)

FOREIGN PATENT DOCUMENTS

| CN | 105531846 A | 4/2016 |
| CN | 106605315 A | 4/2017 |

(Continued)

OTHER PUBLICATIONS

The Extended European Search Report dated Feb. 16, 2022, issued in counterpart to EP Application No. 19911173.3. (7 pages).

(Continued)

*Primary Examiner* — Alix E Eggerding
(74) *Attorney, Agent, or Firm* — WHDA, LLP (57) ABSTRACT

A battery pack includes battery cell including a discharge valve opened when an internal pressure exceeds a set pressure, and case housing battery cell. Exhaust duct through which a discharge gas is discharged from the discharge valve to an outside of the case is disposed in the case, a discharge side of exhaust duct is opened to the outside of the case, and an inflow side of the exhaust duct is opened to an inside of the case, a diffusion space of the discharge gas is provided inside case, the discharge valve ejects the discharge gas into the diffusion space, and the discharge gas of the diffusion space is discharged to the outside of the case via exhaust duct.

10 Claims, 5 Drawing Sheets

(51) Int. Cl.
    *H01M 50/24*        (2021.01)
    *H01M 50/247*     (2021.01)
    *H01M 10/0525*    (2010.01)

(56) References Cited

U.S. PATENT DOCUMENTS

| | | |
|---|---|---|
| 2016/0204404 A1 | 7/2016 | Shimizu et al. |
| 2017/0237055 A1 | 8/2017 | Shimizu et al. |
| 2019/0273243 A1 | 9/2019 | Motokawa et al. |
| 2021/0066690 A1* | 3/2021 | Gondoh .............. H01M 50/367 |

FOREIGN PATENT DOCUMENTS

| | | |
|---|---|---|
| JP | 10-162795 | 6/1998 |
| JP | 2001-196039 | 7/2001 |
| JP | 2005-322434 | 11/2005 |
| JP | 2007-027011 | 2/2007 |
| KR | 2017-090261 | 8/2017 |
| WO | 2018/100983 A1 | 6/2018 |

OTHER PUBLICATIONS

English Translation of Office Action dated Oct. 12, 2022, issued in counterpart CN Application No. 201980087986.1. (5 pages).
International Search Report of PCT application No. PCT/JP2019/048015 dated Mar. 10, 2020.

\* cited by examiner

BATTERY PACK

CROSS-REFERENCE TO RELATED APPLICATIONS

This application is a U.S. national stage application of the PCT International Application No. PCT/JP2019/048015 filed on Dec. 9, 2019, which claims the benefit of foreign priority of Japanese patent application No. 2019-011546 filed on Jan. 25, 2019, the contents all of which are incorporated herein by reference.

TECHNICAL FIELD

The present invention relates to a battery pack that houses a battery that can be charged in an exterior case.

BACKGROUND ART

In recent years, a battery pack used as a power supply of a portable electric device has been further required to have a high output, and a non-aqueous electrolyte secondary battery such as a lithium-ion battery having excellent efficiency per unit volume has been adopted. Although the lithium-ion battery has a high output, an internal pressure may increase for some reason. In order to ensure safety against an increase in the internal pressure of the battery, a discharge valve opened at a set pressure to prevent rupture is provided. When the discharge valve is opened, the battery is in an abnormal heat generation state, and a high-temperature gas is vigorously ejected from the discharge valve. A battery pack in which a hole for discharging discharge gas discharged from a discharge valve to the outside is provided in the exterior case has been developed. (see PTL 1)

A battery pack in which air permeability inside the battery pack is improved by providing a plurality of through-holes in an exterior case and heat is prevented from remaining in the case by dissipating heat has been developed. (see PTL 2)

CITATION LIST

Patent Literature

PTL 1: Unexamined Japanese Patent Publication No. 2001-196039
PTL 2: Unexamined Japanese Patent Publication No. 1998-162795

SUMMARY OF THE INVENTION

In the battery pack of the related art, the hole is provided in the exterior case, and the discharge gas ejected from the discharge valve is discharged to the outside. In this battery pack, it is difficult to safely discharge the high-temperature discharge gas vigorously ejected from the battery cell to the outside. In particular, since the discharge gas ejected from the discharge valve of the lithium-ion battery which is the non-aqueous electrolyte secondary battery is vigorously ejected at an abnormally high temperature of 400° C. or higher, the discharge gas thermally melts the exterior case, and the discharge gas ejected to the outside of the case in a high-temperature state cannot ensure sufficient safety due to smoking, ignition, and the like. Since a flame caused in the exterior case is released to the outside of the case from the hole of the exterior case, safety cannot be further ensured.

The present invention has been developed in order to prevent the above adverse effects, and a main object of the present invention is to provide a battery pack that ensures safety by suppressing adverse effects and flames caused by a high-temperature discharge gas ejected from an opened discharge valve from being released to the outside of a case.

The battery pack of the present invention includes battery cell 1 having a discharge valve opened when an internal pressure exceeds a set pressure, and case 2 housing battery cell 1. Exhaust duct 5 through which a discharge gas is discharged from the discharge valves to an outside of the case is disposed in the case, a discharge side of exhaust duct 5 is opened to the outside of the case, and an inflow side of the exhaust duct is opened to an inside of the case, diffusion space 25 of the discharge gas is provided inside case 2, the discharge valve ejects the discharge gas into diffusion space 25, and the discharge gas of diffusion space 25 is discharged to the outside of the case via exhaust duct 5.

The battery pack of the present invention can enhance safety by suppressing adverse effects caused by the high-temperature discharge gas ejected from the discharge valve of the battery cell. This is because the above battery pack has a structure in which the exhaust duct is provided inside the case, the inflow side of the exhaust duct is opened to the inside of the case, the discharge side is opened to the outside the case, and the diffusion space of the discharge gas is provided inside the case, and the discharge valve ejects the discharge gas into the diffusion space, expands the discharge gas ejected in the diffusion space, further collects the discharge gas in the exhaust duct, and discharges the discharge gas to the outside of the case. In the battery pack described above, the energy of the discharge gas ejected from the battery cell is expanded and diffused in the diffusion space, is collided, and attenuated. The energy is further attenuated and is exhausted to the outside of the case by collecting the energy of the discharge gas diffused in the diffusion space in the exhaust duct and discharging the discharge gas to the outside of the case. That is, in the battery pack described above, the energy of the discharge gas ejected from the discharge valve is attenuated in both a step of attenuating the energy in the diffusion space, collecting the energy from the diffusion space in the exhaust duct, and causing the discharge gas to flow into the exhaust duct, and a step of causing the discharge gas to pass through the exhaust duct, and the discharge gas is exhausted to the outside. The high-temperature discharge gas vigorously ejected from the discharge valve is exhausted to the outside of the case in a state in which both thermal energy and kinetic energy are attenuated. Accordingly, the battery pack described above is characterized in that it is possible to suppress deterioration in safety due to the high-temperature discharge gas by exhausting the high-temperature discharge gas vigorously injected from the discharge valve to the outside of the case in a low energy state, and to suppress release of the flame caused in the case to the outside of the case such that the strength of the flame is weakened by causing the flame to pass through the exhaust duct.

DESCRIPTION OF EMBODIMENTS

A first invention of the present invention is a battery pack including a battery cell having a discharge valve opened when an internal pressure exceeds a set pressure, and a case housing the battery cell. An exhaust duct through which a discharge gas is discharged from the discharge valve to an outside of the case is disposed in the case, a discharge side of the exhaust duct is opened to the outside of the case, and an inflow side of the exhaust duct is opened to an inside of the case, a diffusion space of the discharge gas is provided inside the case, the discharge valve ejects the discharge gas into the diffusion space, and the discharge gas of the diffusion space is discharged to the outside of the case via the exhaust duct.

In a second invention of the present invention, the exhaust duct is a thin tube duct having a shape in which a thickness is smaller than a width, and the thin tube duct is disposed in the case with a thickness direction of the thin tube duct as a thickness direction of the case. In the battery pack having this structure, the exhaust duct can be disposed in a narrow region in the case. Passage resistance is increased by decreasing a thickness of the exhaust duct. It is possible to more efficiently attenuate the energy of the discharge gas, and it is possible to weaken the strength of a flame.

In a third invention of the present invention, a battery block is provided by arranging a plurality of the battery cells in an identical plane in parallel with each other, and the thin tube duct is disposed between the battery block and an inner surface of the case. In the battery pack having this structure, the thin tube duct is disposed between the battery block and the inner surface of the case while the battery block including the plurality of battery cells is thinned, and thus, the exhaust duct can be disposed in a space-saving manner while the entire battery pack is thinned.

In a fourth invention of the present invention, the exhaust ducts are arranged along opposite sides in the case. In the battery pack having this structure, the discharge gas can be smoothly exhausted to the outside of the case by arranging the plurality of exhaust ducts in the case.

In a fifth invention of the present invention, the exhaust duct extends in a width of the case, and an entire length of the exhaust duct is longer than 60% of the case in the width. In this battery pack, the exhaust duct is lengthened in the width of the case, and the energy of the discharge gas can be efficiently attenuated and exhausted.

In a sixth invention of the present invention, the exhaust duct extends in a longitudinal direction of the case, and an entire length of the exhaust duct is longer than 60% of the case in the longitudinal direction. In this battery pack, it is possible to increase the resistance of the discharge gas by lengthening the exhaust duct.

In a seventh invention of the present invention, the exhaust duct extends in the case in a direction intersecting a longitudinal direction of the battery cell. In the battery pack having this structure, since an ejection direction of the discharge gas and an exhaust direction of the exhaust duct intersect each other, the energy of the discharge gas can be efficiently attenuated by discharging the discharge gas ejected from the battery cell to the outside while the discharge gas is redirected in the case.

In an eighth invention of the present invention, a label peeled off or melted by the discharge gas discharged from the discharge valve is attached to the discharge side of the exhaust duct. In this battery pack, since the discharge side of the exhaust duct is blocked by the label, foreign substances can be effectively prevented from entering the exhaust duct from the outside.

In a ninth invention of the present invention, the battery cell is a non-aqueous electrolyte secondary battery. In a tenth invention of the present invention, the battery cell is a lithium-ion battery.

Hereinafter, the present invention will be described in detail with reference to the drawings. In the following description, terms (for example, "upper", "lower", and other terms including these terms) indicating specific directions and positions are used as necessary, but these terms are used to facilitate understanding of the invention with reference to the drawings, and the technical scope of the present invention is not limited by the meanings of these terms. Parts denoted by identical reference marks in a plurality of drawings indicate identical or equivalent parts or members.

The following exemplary embodiments illustrate specific examples of the technical idea of the present invention, and do not limit the present invention to the following exemplary embodiments. Unless otherwise specified, dimensions, materials, shapes, relative arrangements, and the like of constituent components to be described below are not intended to limit the scope of the present invention, but are intended to be illustrative. Contents described in one exemplary embodiment and example are also applicable to other exemplary embodiments and examples. Sizes, positional relationships, and the like of members illustrated in the drawings may be exaggerated in order to clarify the description.

First Exemplary Embodiment

Battery pack 100 illustrated in FIGS. 1 to 4 includes chargeable battery cells 1, case 2 housing battery cells 1, exhaust ducts 5 housed in case 2, and circuit board 3 on which an electronic component such as a battery protection circuit is mounted.

(Battery Cell 1)

Battery cell 1 is a battery having a cylindrical shape. In the cylindrical battery, an electrode and an electrolytic solution are housed in a metal case having a cylindrical shape. The metal case has a sealed structure in which a sealing plate is airtightly fixed to an opening of an exterior can blocking a bottom. The exterior can is manufactured by pressing a metal plate. The sealing plate is airtightly fixed by being crimped to a peripheral edge of the opening of the exterior can with an insulating packing interposed therebetween.

Although not illustrated, a discharge valve on the sealing plate is provided in battery cell 1 in order to prevent damage due to an abnormally high internal pressure of the metal case. In the discharge valve, an opening through which an internal gas and the like are discharged in an opened state is provided in the sealing plate. However, in the battery cell, the discharge valve and the opening thereof may be provided at a bottom portion of the exterior can. When the internal pressure becomes higher than a set pressure, for example, 1.5 MPa, the discharge valve is opened to prevent destruction of the metal case due to an increase in the internal pressure. The discharge valve is opened in an abnormal state. Accordingly, in a state in which the discharge valve is opened, a temperature of battery cell 1 is also very high. Thus, the gas and the electrolytic solution (ejected matter) discharged from the opened discharge valve have an abnormal high temperature. Particularly, in a battery pack in which battery cell 1 is a non-aqueous electrolyte secondary battery such as a lithium-ion battery, a discharge gas has an abnormal high temperature of 400° C. or higher. Since the lithium-ion battery is filled with a non-aqueous electrolytic solution, when the electrolytic solution is discharged to the outside of the case at a high temperature, the electrolytic solution may be ignited by being in contact with air, and may have an abnormal higher temperature. In not only the lithium-ion battery but also other chargeable batteries, since the discharge gas ejected from the opened discharge valve has a high temperature, it is important to attenuate the energy of the discharge gas and exhaust the discharge gas to the outside of the case for enhancing safety.

(Case 2)

Case 2 is made of a thermoplastic resin such as polycarbonate, is molded in a box shape having a rectangular shape as a whole, and has battery cells 1, circuit board 3, and exhaust ducts 5 built therein. Case 2 in the drawing includes upper case 2A and lower case 2B. At lower case 2B and upper case 2A, peripheral wall 22 is provided around surface plate 21 having a quadrangular shape, specifically, a rectangular shape in the drawing. Lower case 2B and upper case 2A are coupled with opening end surfaces of peripheral wall 22 as mating surfaces. Peripheral wall 22 of lower case 2B and upper case 2A includes side walls 23 on both sides extending in a longitudinal direction of rectangular surface plate 21 and end walls 24 orthogonal to side walls 23. Heat-resistant covers 6 is arranged inside end walls 24 facing the openings of the discharge valves. Heat-resistant cover 6 is a heat-resistant plate or sheet that withstands the temperature of the discharge gas. Heat-resistant cover 6 prevents the discharge gas ejected from the discharge valve from being directly ejected to end wall 24, and scatter the discharge gas in all directions. A case having end walls made of a heat-resistant material can scatter the discharge gas around by end walls without providing the heat-resistant covers.

Figure 1:
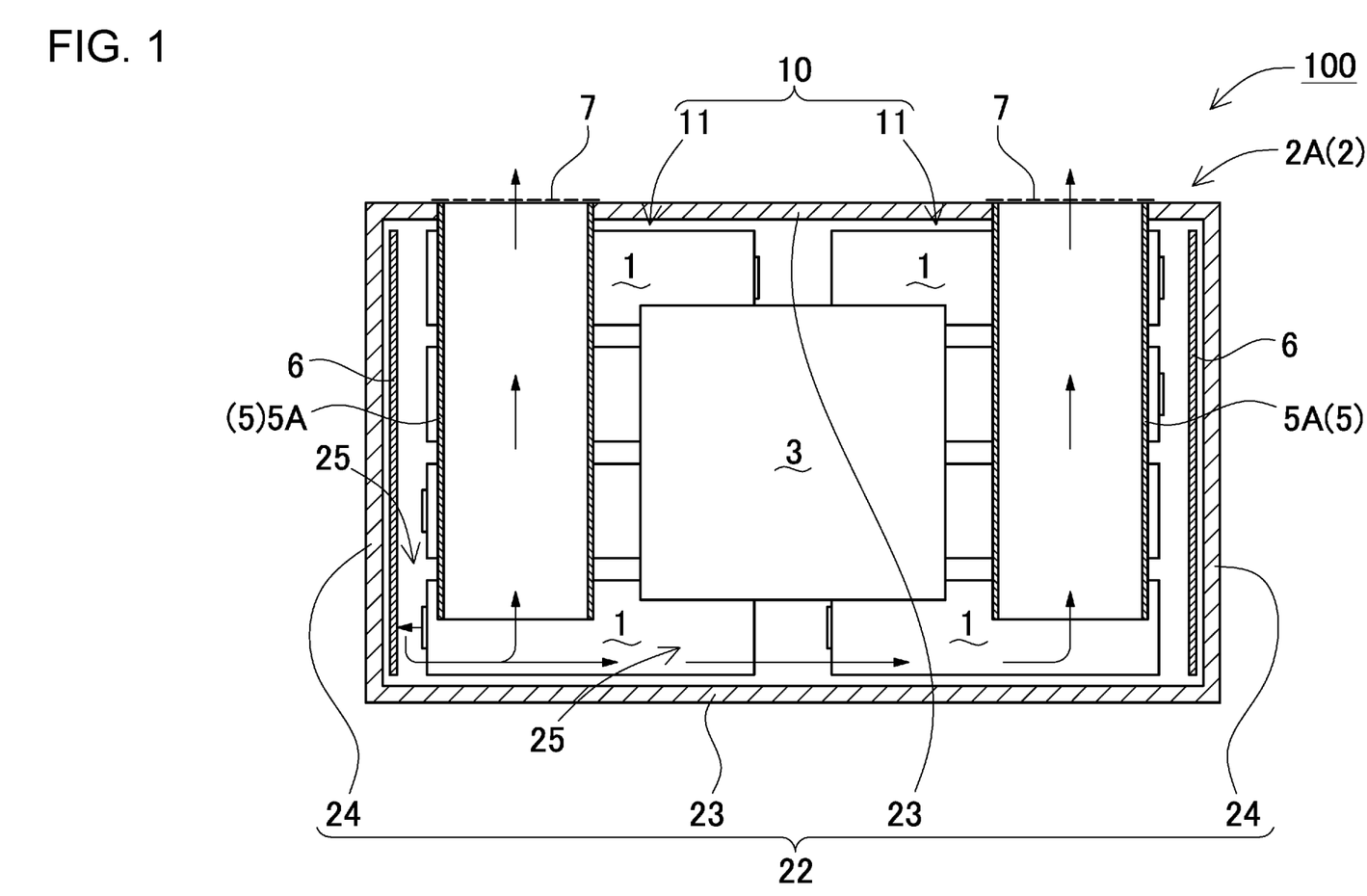
FIG. 1 is a schematic horizontal cross-sectional view illustrating an internal structure of a battery pack according to a first exemplary embodiment of the present invention.
Figure 2:
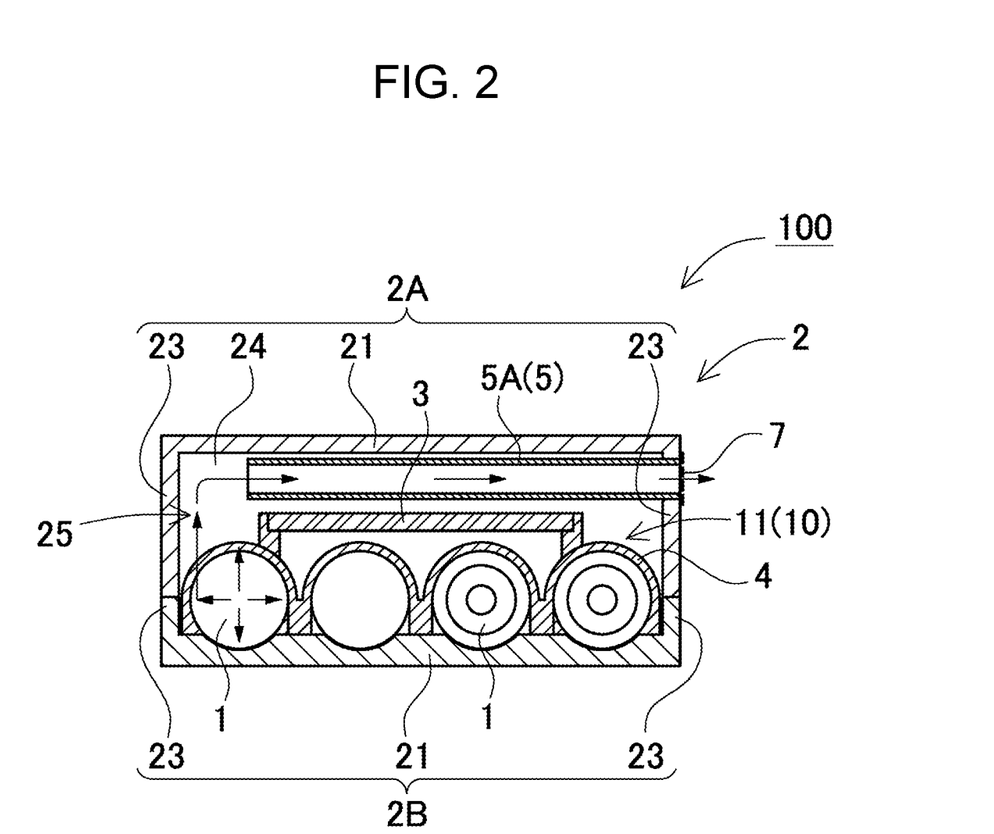
FIG. 2 is a vertical longitudinal cross-sectional view of the battery pack according to the first exemplary embodiment of the present invention.
Figure 3:
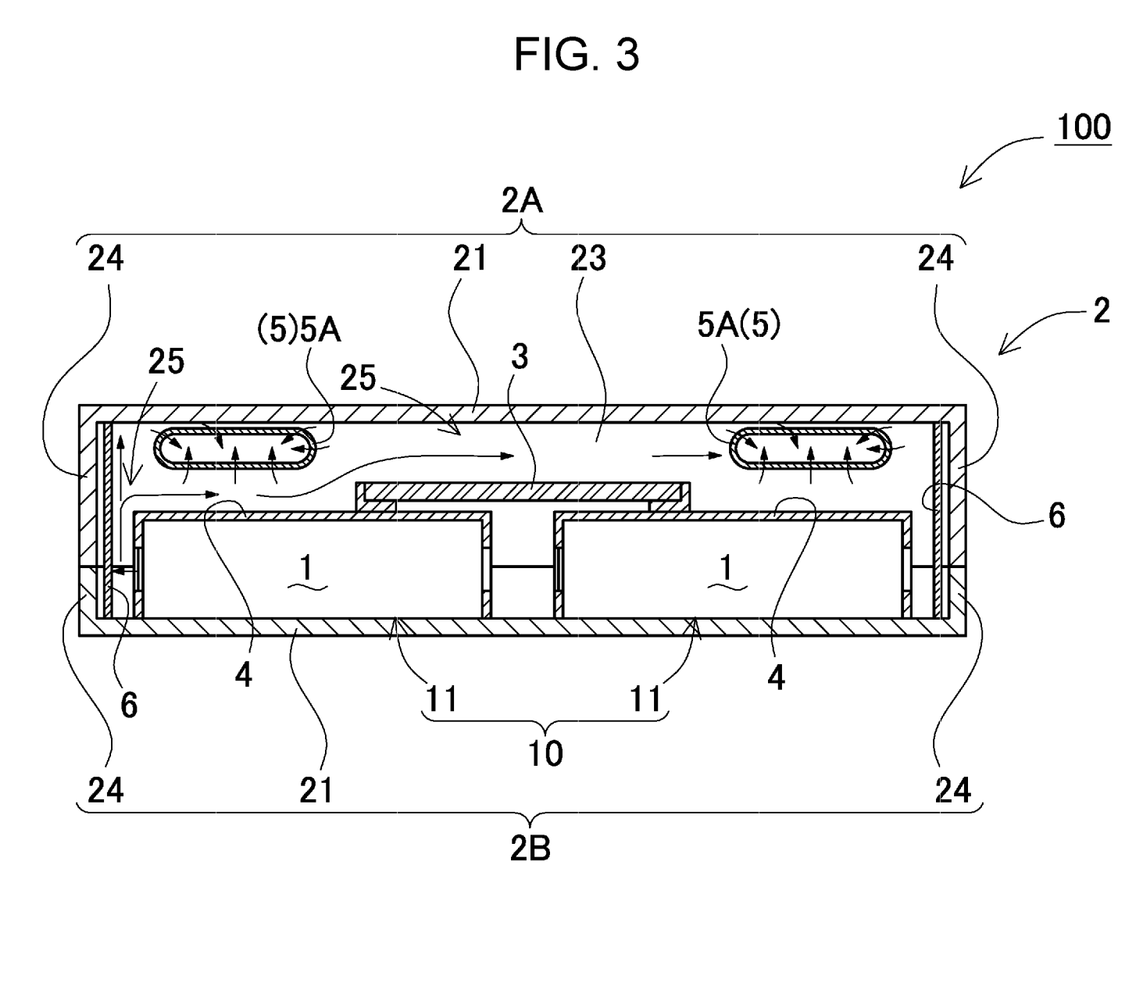
FIG. 3 is a vertical transversal cross-sectional view of the battery pack according to the first exemplary embodiment of the present invention.

In battery pack 100 of FIGS. 1 to 3, battery block 10 is disposed in the case. Battery block 10 includes two sets of battery assemblies 11. In battery assembly 11, battery cells 1 are arranged at fixed positions by inserting battery cells 1 into battery holders 4. In battery holder 4, battery cells 1 are arranged in four rows in parallel to side wall 23 of case 2. Battery block 10 in which two sets of battery assemblies 11 are arranged in two stages in a longitudinal direction of case 2 and eight battery cells 1 are connected in series and in parallel in four rows and two stages is provided. Each battery assembly 11 is disposed in the case such that the openings of the discharge valves of two battery cells 1 face end wall 24. In battery pack 100 in the drawing, battery assembly 11 includes four battery cells 1, battery block 10 includes two sets of battery assemblies 11, and battery block 10 is disposed in the case. However, the battery pack of the present invention does not specify a number or connection state of the battery cells housed in the case.

(Circuit Board 3)

An electronic component (not illustrated) connected to battery cells 1 to achieve a protection circuit for battery cells 1 is mounted on circuit board 3. The protection circuit is a circuit that prevents overcharge and overdischarge of battery cells 1, a circuit that prevents overcurrent, or a circuit that interrupts current in a state in which the temperature rises abnormally.

(Exhaust Duct 9)

Battery pack 100 includes, inside case 2, exhaust ducts 5 through which the discharge gas ejected from the openings of the discharge valves are discharged to the outside of case 2. Exhaust duct 5 has an inflow side opened to the inside of the case and a discharge side opened to the outside of the case such that the discharge gas can flow into the case and be exhausted to the outside of the case. In battery pack 100 of FIG. 1, label 7 peeled off or melted by the discharge gas is attached to the discharge side of exhaust duct 5. Battery pack 100 can block the discharge side of exhaust duct 5 by label 7 to prevent foreign substances from entering. Battery pack 100 ejects the discharge gas discharged from the discharge valve into diffusion space 25 provided in the case, causes the discharge gas to flow into exhaust ducts 5 from diffusion space 25, and discharges the discharge gas to the outside of the case through exhaust ducts 5. Diffusion space 25 is provided inside case 2. In battery pack 100 illustrated in FIGS. 1 to 4, a space formed inside case 2 is used as diffusion space 25 of the discharge gas. Diffusion space 25 is a gap that diffuses the discharge gas injected into the case and guides the discharge gas to exhaust ducts 5. In battery pack 100 in the drawing, since battery block 10, circuit board 3, and the like are arranged as a built-in structure in the case, diffusion space 25 is formed as a gap between case 2 and the built-in structure. In battery block 10, battery cells 1 are arranged at fixed positions in battery holder 4, but gaps formed between battery holder 4, battery cells 1, and case 2 also serve as diffusion space 25. Diffusion space 25 diffuses the discharge gas instantaneously discharged from the discharge valve, attenuates the energy of the discharge gas, and causes the discharge gas to flow into exhaust ducts 5.

Battery pack 100 diffuses the discharge gas ejected from the discharge valves of battery cells 1 into diffusion space 25, attenuates the energy in diffusion space 25, further attenuates the energy in exhaust ducts 5, and discharges the discharge gas to the outside of the case. Exhaust ducts 5 attenuate the energy of the discharge gas by resistance of the discharge gas passing through the inside and exhaust the discharge gas to the outside of the case. Even when a flame is caused in the case, the flame can be extinguished by passing through exhaust ducts 5, and the flame can be prevented from being discharged to the outside of the case. Exhaust ducts 5 in FIGS. 1 to 4 are thin tube ducts 5A each having a shape in which a thickness is smaller than a width. There are characteristics that thin tube ducts 5A can effectively attenuate the energy and can be arranged in a narrow space by increasing the passage resistance of the discharge gas due to thinning.

In battery pack 100 of FIGS. 2 and 3, thin tube ducts 5A are arranged in a gap formed between the battery pack and battery block 10 inside surface plate 21 of case 2. In battery pack 100 of FIG. 3, two rows of thin tube ducts 5A are arranged on both sides of circuit board 3. Thin tube ducts 5A are arranged inside surface plate 21 of case 2 with thickness direction of case 2 as a thickness direction. In battery pack 100 of FIGS. 3 and 4, a pair of exhaust ducts 5 are arranged along opposite sides in the case. Case 2 is a rectangular cuboid, and exhaust ducts 5 are arranged in two rows at both ends inside rectangular surface plate 21, and extend in a width of case 2. In exhaust duct 5, the passage resistance of the discharge gas increases in proportion to a length. In battery pack 100 illustrated in FIGS. 1 and 2, the passage resistance of the gas is increased by setting the length of exhaust duct 5 to be substantially equal to a lateral width of case 2. The energy of the discharge gas is efficiently attenuated and exhausted by setting exhaust duct 5 to be preferably longer than 60% of the lateral width of case 2.

Figure 4:
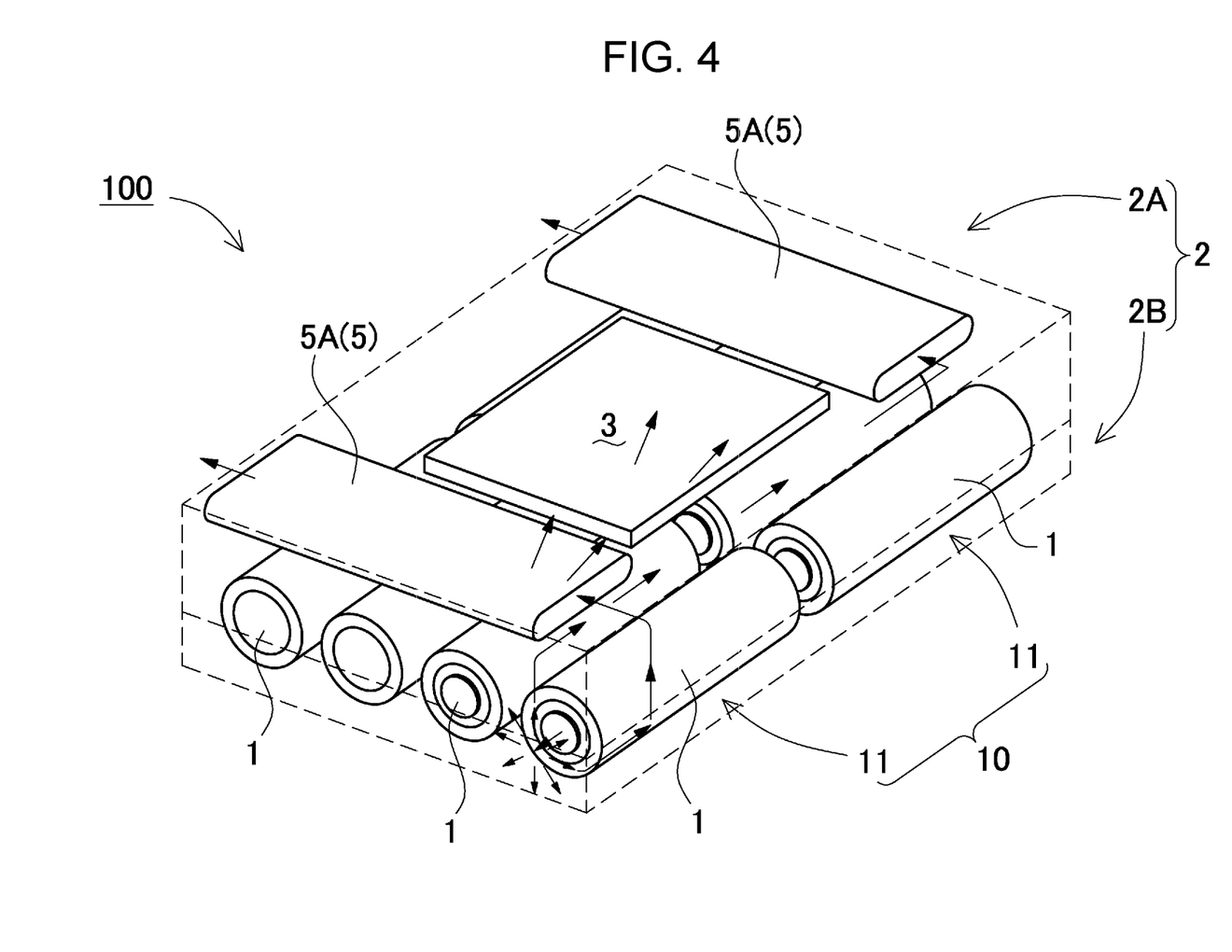
FIG. 4 is a schematic perspective view illustrating the internal structure of the battery pack according to the first exemplary embodiment of the present invention.

In battery pack 100 illustrated in a schematic perspective view of FIG. 4, battery cells 1 and exhaust ducts 5 arranged in the case extends in a direction intersecting each other. Battery cells 1 extend in the longitudinal direction of rectangular surface plate 21, exhaust ducts 5 extend in a width, and battery cells 1 and exhaust ducts 5 are arranged in a direction orthogonal to each other. Battery cells 1 inject the discharge gas in the longitudinal direction of case 2 from the opened discharge valves, and exhaust ducts 5 cause the inflow discharge gas to flow in the width of case 2 to be exhausted. That is, an ejection direction of the discharge gas and an exhaust direction of exhaust ducts 5 intersect each other, and are directions orthogonal to each other in the drawing. Thus, the discharge gas is redirected in the case, and is exhausted to the outside.

In FIGS. 1 to 4, battery cells 1 extend in the longitudinal direction of rectangular surface plate 21, but may extend in a width of the rectangular surface plate. In this case, the exhaust ducts extend in the longitudinal direction of the rectangular surface plate. With this arrangement, the ejection direction of the discharge gas from the discharge valves of the battery cells and the exhaust direction of the exhaust ducts intersect each other. When the battery cells extend in a height in the case, the exhaust ducts may extend in the longitudinal direction of the rectangular surface plate or extend in the width direction. In any case, the ejection direction of the discharge gas from the battery cells and the exhaust direction of the exhaust ducts intersect each other.

The discharge gas ejected into the case from the discharge valves flows in directions indicated by arrows in FIG. 4 and is exhausted to the outside of the case. In the discharge valves of battery cells 1, the openings are arranged to face end walls 24 of case 2. The discharge gas ejected from the discharge valves is ejected toward end walls 24. Since heat-resistant covers 6 are arranged inside end walls 24, the discharge gas collides with heat-resistant covers 6 and is scattered around. The discharge gas that has collided with heat-resistant covers 6 flows into diffusion space 25 and is diffused. As indicated by the arrows in the drawing, the discharge gas flowing into diffusion space 25 collides with an inner surface of case 2, is dispersed, is redirected, and flows into exhaust ducts 5. As indicated by arrows in FIG. 4, the discharge gas collides with the inner surface of case 2, is dispersed, and is redirected. The energy of the discharge gas is attenuated, and the discharge gas flows into exhaust ducts 5. The energy of the discharge gas is further attenuated by resistance of exhaust ducts 5, and the discharge gas is exhausted to the outside of the case. The structure in which the energy of the discharge gas is attenuated and the discharge gas is exhausted to the outside of the case can improve safety by suppressing adverse effects such as ignition outside the case.

Second Exemplary Embodiment

Figure 5:
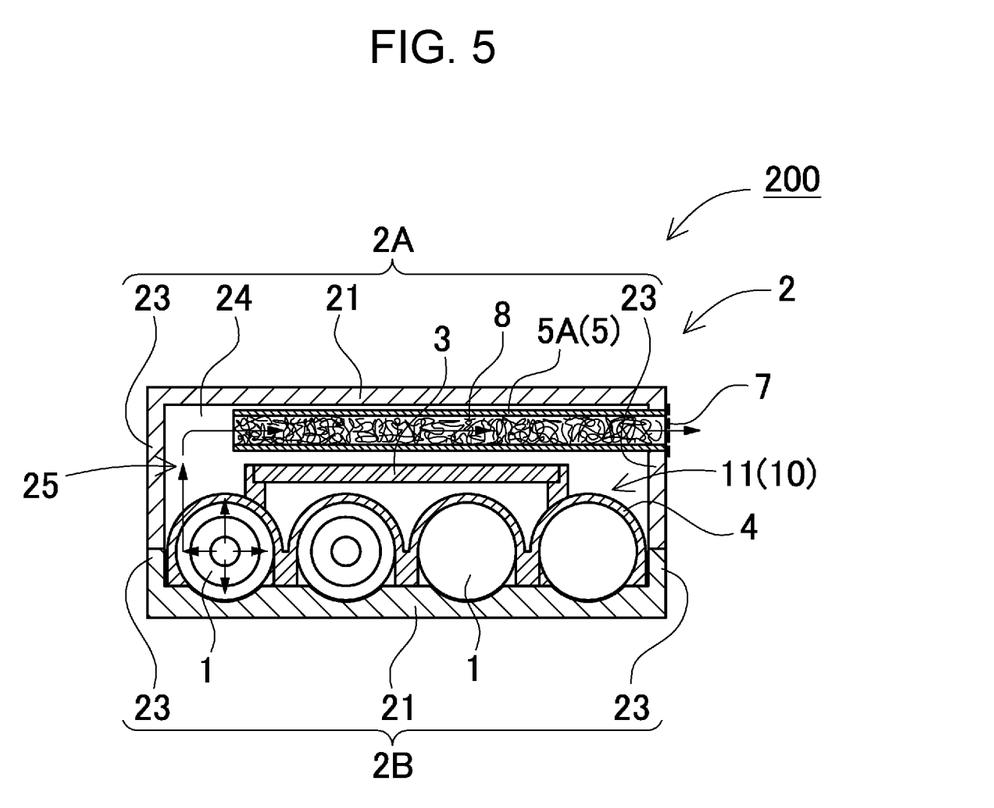
FIG. 5 is a vertical transversal cross-sectional view illustrating an internal structure of a battery pack according to a second exemplary embodiment of the present invention.

In battery pack 200 illustrated in a cross-sectional view of FIG. 5, heat-resistant fibers 8 are filled inside exhaust ducts 5. Inorganic fibers such as rock wool and metal fibers can be used as heat-resistant fibers 8. There are characteristics that exhaust ducts 5 filled with heat-resistant fibers 8 can increase the resistance of the discharge gas even with a shortened duct length and can control the passage resistance of the discharge gas by adjusting a filling density of heat-resistant fibers 8.

INDUSTRIAL APPLICABILITY

The present invention can be effectively used for a battery pack that safely exhausts a discharge gas.

REFERENCE MARKS IN THE DRAWINGS

100, 200: battery pack
1: battery cell
2: case
2A: upper case
2B: lower case
3: circuit board
4: battery holder
5: exhaust duct
5A: thin tube duct
6: heat-resistant cover
7: label
8: heat-resistant fiber
10: battery block
11: battery assembly
21: surface plate
22: peripheral wall
23: side wall
24: end wall
25: diffusion space

The invention claimed is:

1. A battery pack comprising:
   a battery cell including a discharge valve opened when an internal pressure of the battery cell exceeds a set pressure; and
   a case housing the battery cell, wherein
   an exhaust duct is disposed in the case,
   a discharge side of the exhaust duct is opened to an outside of the case, and an inflow side of the exhaust duct is opened to an inside of the case,
   a diffusion space, distinct from the exhaust duct, is provided inside the case,
   the discharge valve is configured to eject a discharge gas initially into the diffusion space such that the discharge gas travels from the diffusion space into the exhaust duct and then to the outside of the case via the exhaust duct,
   the exhaust duct comprises one or more tubes each elongated in an axial direction thereof perpendicular to a direction in which the discharge valve is directed,
   each tube having only a single pair of inlet and outlet openings disposed respectively at two opposite ends in the axial direction,
   the case includes a first wall and a second wall opposite each other with the battery cell interposed therebetween, and
   the outlet opening is disposed through the first wall, and the inlet opening is disposed facing an inner surface of the second wall inside of the case.

2. The battery pack according to claim 1, wherein
   the exhaust duct is a thin tube duct including a shape in which a thickness is smaller than a width, and
   the thin tube duct is disposed in the case with a thickness direction of the thin tube duct as a thickness direction of the case.

3. The battery pack according to claim 2, wherein
   a battery block is provided by arranging a plurality of the battery cells in an identical plane in parallel with each other, and
   the thin tube duct is disposed between the battery block and an inner surface of the case.

4. The battery pack according to claim 1, wherein a pair of the exhaust ducts are arranged along each of opposite sides in the case.

5. The battery pack according to claim 1, wherein
the exhaust duct extends in a width of the case, and
an entire length of the exhaust duct is longer than 60% of the case in the width.

6. The battery pack according to claim 1, wherein
the exhaust duct extends in a longitudinal direction of the case, and
an entire length of the exhaust duct is longer than 60% of the case in the longitudinal direction.

7. The battery pack according to claim 1, wherein the exhaust duct extends in the case in a direction intersecting a longitudinal direction of the battery cell.

8. The battery pack according to claim 1, wherein a label is attached to the discharge side of the exhaust duct, a label being peeled off or melted by the discharge gas discharged from the discharge valve.

9. The battery pack according to claim 1, wherein the battery cell is a non-aqueous electrolyte secondary battery.

10. The battery pack according to claim 9, wherein the battery cell is a lithium-ion battery.

* * * * *